Nov. 18, 1941.  J. G. SCOTT  2,263,522
APPARATUS FOR CONTROL AND UTILIZATION OF DRY ICE
Filed Dec. 24, 1936  6 Sheets-Sheet 1

Inventor
James G. Scott
By Lloyd W. Pateb
Attorney

Nov. 18, 1941.   J. G. SCOTT   2,263,522
APPARATUS FOR CONTROL AND UTILIZATION OF DRY ICE
Filed Dec. 24, 1936   6 Sheets-Sheet 2

Inventor
James G. Scott
By Lloyd W. Patch
Attorney

Nov. 18, 1941.　　　J. G. SCOTT　　　2,263,522
APPARATUS FOR CONTROL AND UTILIZATION OF DRY ICE
Filed Dec. 24, 1936　　　6 Sheets-Sheet 4

Inventor
James G. Scott
By Lloyd W. Patel
Attorney

Nov. 18, 1941.  J. G. SCOTT  2,263,522
APPARATUS FOR CONTROL AND UTILIZATION OF DRY ICE
Filed Dec. 24, 1936  6 Sheets-Sheet 5

Inventor
James G. Scott
By Lloyd W. Patek
Attorney

Patented Nov. 18, 1941

2,263,522

UNITED STATES PATENT OFFICE 2,263,522

APPARATUS FOR CONTROL AND UTILIZATION OF DRY ICE

James G. Scott, Washington, D. C.

Application December 24, 1936, Serial No. 117,650

7 Claims. (Cl. 62—91.5)

This invention relates to apparatus for and the method of control and utilization of dry ice, and particularly to means and a method adapted for use and employment with solidified carbon dioxide or a similar solidified refrigerant.

My present invention pertains in particular to refrigeration of the type set forth in my copending application Serial No. 561,069, and embodies improvements upon and extensions of the invention, construction and principle disclosed in said application.

The primary object of my invention is to provide apparatus for and the method of control and utilization of dry ice when used for attainment and maintenance of lowered temperatures.

Another object is to provide means and a method adapted for the use of solidified carbon dioxide or a similar refrigerant and which are embodied and carried out in such manner that high efficiency in the use of the refrigerant is attained, and at the same time the temperature in storage or other compartments can be varied and sublimation or evaporation of the solid refrigerant will be retarded to thus obviate the necessity for frequent supplying of the apparatus with the solidified refrigerant.

A further object and purpose is to provide means and a method that can be embodied in and carried out with an installation in a refrigerator of either domestic or commercial type, in a refrigerator car, in a delivery truck or other vehicle, in connection with a compartment or space to be cooled or refrigerated, and in any and all other adaptations and uses that may be desired.

Another object is to provide a structure in which a refrigerating compartment is separated into an upper freezing and a lower storage compartment or space, with the heat exchange or heat absorbing unit or means in the upper freezing compartment and the lower compartment closed against direct communication with the freezing compartment and consequently with the unit, to thus prevent removal of moisture from food products or other materials placed within the lower storage compartment thereby allowing use of this compartment as a hydrator compartment.

Another important purpose of this invention is to provide apparatus and a method by which the temperature surrounding the solidified carbon dioxide or other solidified refrigerant is maintained near the sublimation temperature to thus retard sublimation.

A further object is to provide means whereby the temperature of the upper freezing compartment, and consequently also of the lower storage compartment can be controlled and varied, with consequent retardation of the sublimation or evaporation of the solidified refrigerant.

Yet another purpose is to embody structure by which the sublimation or evaporation of a block or lump or piece of solidified refrigerant is substantially retarded on all sides except as heat is absorbed from the refrigerating compartment.

Still another object and purpose is to provide a method of controlling the heat absorption from a refrigerating compartment, where a solidified refrigerant is employed.

A further object is to provide an apparatus and method by which an inert gas, such as the gas resulting from sublimation of solidified carbon dioxide, is made available to aid in the preservation of foods and other perishable materials stored or contained within a part of a refrigerating compartment.

Another object is to provide an apparatus of this character in which the operation will be entirely automatic, without requiring a power unit or other mechanical appliances or layouts such as are now employed in carrying out compression and absorption cycles in mechanical refrigerators, and with which the sublimation or evaporation of the solidified refrigerant is retarded and is checked to substantially only such evaporation as is required to maintain a desired and proper temperature within the refrigerating compartment, thus obviating the necessity for daily servicing and making necessary the supply of solidified refrigerant only weekly or at other relatively long intervals.

Another purpose is to provide a refrigerator structure of this character in which the heat conductivity from the storage compartment to the refrigerant container can be varied and regulated.

Yet another purpose is to provide in a refrigerator with air humidity and circulation, the introduction of atmospheric air with the necessary humidity to keep a well balanced refrigeration with all the factors of safety by providing a circulation of pure chilled air.

A further object is to provide ice cubes, or other water ice products within the refrigerator, in such arrangement and disposition that the ice cubes or the like will be maintained at a temperature to retard melting, and such melting as does occur will supply liquid and moisture to maintain humidity of the air within the refrigerator structure and the liquid will aid in absorbing and removing toxic gases and the like.

Yet a further object is to provide a refrigerator structure which will make possible the domestic or commercial use of solidified carbon dioxide or dry ice as a refrigerant, thus attaining a superabundance of cold or energy, and which consequently permits introduction of sufficient outside or atmospheric air to prevent collection of toxic gases, noxious odors, or the like, to be absorbed by food or other products or materials contained within the refrigerator; this purifying or air conditioning by the use and introduction and circulation of outside air being permitted by the superabundance of energy of the solidified carbon dioxide, without danger of raising the temperature within the refrigerator above a safe point or temperature desired for food preservation or the like.

Still another purpose is to provide for introduction and storage of ice cubes to be available for household or other use, and which water ice product will be maintained by the solidified carbon dioxide against excessive melting, but by slow melting will supply sufficient moisture to maintain the desired humidity within the refrigerator and at the same time the water from the melting ice will absorb injurious gases and noxious odors and will carry the same off to be removed from the refrigerator through a suitable drain or other discharge.

Another object is to provide a closed refrigerant container to confine the gases resultant from sublimation of the solidified refrigerant, such as solidified carbon dioxide, together with temperature controlled gas outlet means to allow escape of the gas and consequently increase sublimation to reduce the temperature, together with means to prevent accumulation of an excessive and dangerous pressure within the container.

Still other objects and purposes are to provide a refrigerating apparatus and a method of refrigeration which contemplate employment of apparatus of relatively simple and inexpensive construction, and the carrying out of the method which will permit close control of temperatures attained and maintained within the refrigerating compartment and will give economical service at relatively low cost, without necessity for power charges and with little likelihood of replacement of any of the original structural portions.

With the above and other objects in view, which will be apparent to those skilled in the art, my invention includes certain novel features of construction, and combinations and arrangements and assemblies of parts, and contemplates the carrying out of certain steps or procedures in the accomplishment of the method or process, which will be hereinafter set forth more fully in connection with the drawings and then pointed out in the claims.

In the drawings:

Fig. 2 is a vertical sectional view taken substantially at right angles to the showing in Figure 1.

Fig. 2 is a perspective view illustrating a sublimation or evaporation retarding blanket.

Fig. 5 is a perspective view to better illustrate the construction of the refrigerator dividing baffle and air circulation means.

The cabinet or case 1 is here shown as being of the upright type, with a refrigerant storage container 2 in the upper part thereof and a refrigerated compartment 3 in the lower part thereof. The case or cabinet structure 1 can be made of metal or of any other suitable material, and can be constructed and shaped in any desired manner.

Figure 1:
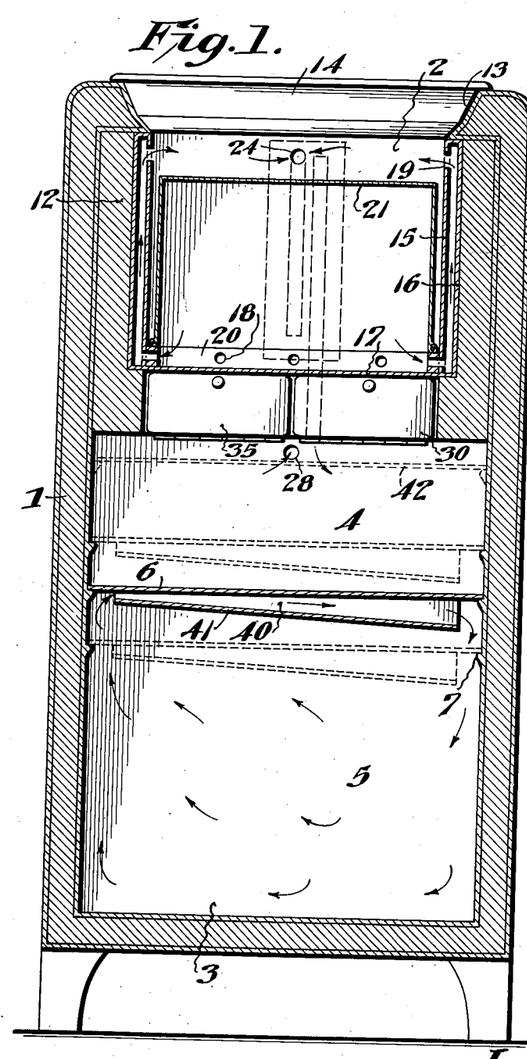
Figure 1 is a vertical sectional view taken from side to side through a refrigerator constructed in accordance with my invention.

My invention contemplates separation of the compartment 3 into an upper freezing section 4, and a lower storage section 5; and to accomplish this division or separation of the compartment 3 into the upper and lower sections, I provide a wall portion 6 which is mounted transversely across within the compartment 3 in substantially horizontal disposition. This wall portion 6 thus serves as a partition and a baffle wall to positively divide off and close the upper freezing section 4 from the lower storage section 5; and, for purposes of adjustment, it may be desirable to fit the wall portion 6 removably in place to be supported and held in the proper elevation and fitting by the guideways or rests 7. As shown in Figure 1, it may be found advantageous to have several sets of these guides or rests 7 so that the wall portion or baffle 6 can be adjusted upwardly or downwardly from the position illustrated in full lines, to either one or the other of the positions indicated in dotted lines.

The case or cabinet 1 has a door opening 8 through one side thereof to give access to the compartment 3, and a door 9 is provided to close this opening. The door opening 8 is here illustrated as being of sufficient size to permit access to be had to the upper freezing section 4 and the lower storage section 5 of the compartment 3, and if desired, an inside door 10 can be provided to close the opening into the freezing section 4 when the door 9 is opened to give access to the storage section 5. Also, an inside door, similar to the door 10, can be provided to close the opening into the storage section 5. It may be found desirable to provide packing strips or members 11 on the forward and rear sides of the wall or baffle portion 6, so that when the door 9 is closed a substantially fluid tight closure is accomplished between the upper freezing section 4 and the lower storage section 5; and, under some circumstances and in some uses it may be found desirable to provide similar packing at the ends of the wall portion 6 to bear against the sides of the wall of the case or cabinet 1 and thus insure against passage of gas or air between the sections 4 and 5.

In the present instance I have illustrated my invention as embodied in a refrigerator structure particularly intended and adapted to use or employ solidified carbon dioxide as a refrigerating medium or agency, and the refrigerant container 2 is here illustrated as constructed accordingly. The upper portion of the cabinet or case structure 1 has additional insulation introduced as at 12, around and within the side walls, and an opening is provided at 13 through the top to give access to the interior of the upper portion of the case or cabinet, a door or cover 14, or other suitable closure being provided to close this opening 13. It is desirable that the opening 13 be closed and sealed to be substantially air and gas tight, and it will therefore be appreciated that two separate doors or closures may be employed, and that these will be packed or sealed, in any approved manner, to accomplish the desired purpose. A refrigerant container 15, preferably made of sheet metal, is placed within the refrigerant container compartment 2, and is spaced from the inner walls of the insulation 12 to thus give a circulation space 16 on all sides. The bottom 17 of the refrigerant container compartment extends across to close the upper portion 2 from the freezing section 4, and in this way the case or cabinet 1 is substantially divided into three separate and distinct portions or sections, namely an upright refrigerant container section, a lower storage section, and an intermediate or middle freezing section.

Figures 2, 3, 5:
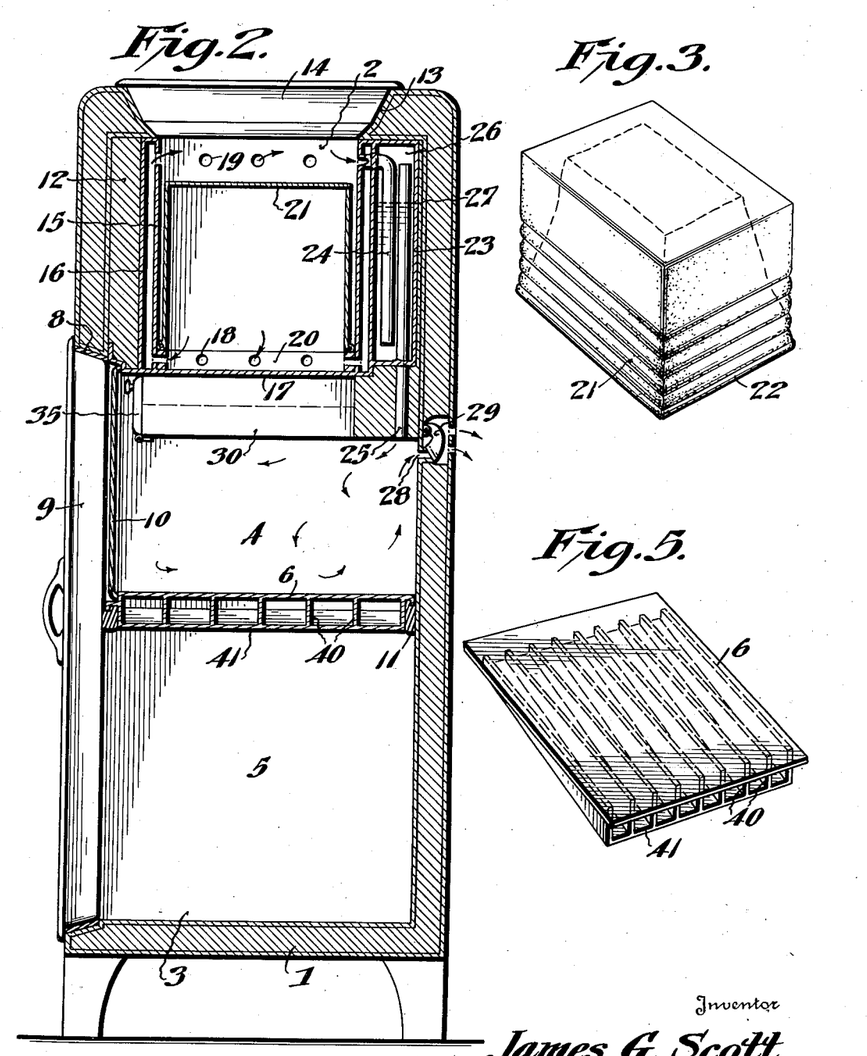

The spaced side wall portion 15 has openings 18 formed therethrough adjacent to the lower edge and openings 19 therethrough adjacent to its top edge, and a supporting flange or cleat 20 is provided adjacent to the bottom portion 17 to provide a supporting ledge above the openings 18. When solidified carbon dioxide, or a similar solidified refrigerant is placed within the refrigerant container space 2, the block or mass of refrigerant will be supported upon the upper side of the bottom member 17, and a flexible and collapsible blanket 21 is provided to be placed over the block or mass of refrigerant and to rest upon the ledge formed by the flange or cleat 20. As shown in Figs. 1 and 2, this blanket or cover 21 is fully distended or extended as it will appear when placed over a block or cake of solidified refrigerant of maximum size capable of use in this particular size of refrigerator, and in Fig. 3 I have illustrated the blanket 21 as it will appear when in use. The blanket 21 preferably has the lower edge 22 thereof rolled or enlarged to receive and hold a wire or other member by which the substantially rectangular shape of the opening of the blanket is preserved, and this enlargement at 22 also serves to provide a weight at the edge of the blanket structure on all sides to hold the blanket edge firmly pressed and closed against the shoulder of the flange or cleat 20 at all times during use.

At the rear, at one side, or at any other convenient point, I provide a liquid trap pressure valve casing 23, which is preferably entirely closed and sealed at all points, except as will be now explained. A gas conducting tube 24 is connected in communication with the upper portion of the refrigerant container section 2, and this gas conducting tube 24 extends into the liquid seal or valve casing 23 to have its lower open end low down within the case 23. A gas discharge tube 26 has its open upper end disposed well up toward the top or gas accumulation space 26 within the case 23, and this gas discharge tube 25 has its lower gas discharging end opening into the freezing section 4. Oil, or any other liquid which will not combine with carbon dioxide gas, or the gas produced by sublimation of the solidified refrigerant, is filled into the liquid seal or valve casing 23 substantially to the level indicated at 27 in Fig. 4, or to any other desired level.

Figure 4:
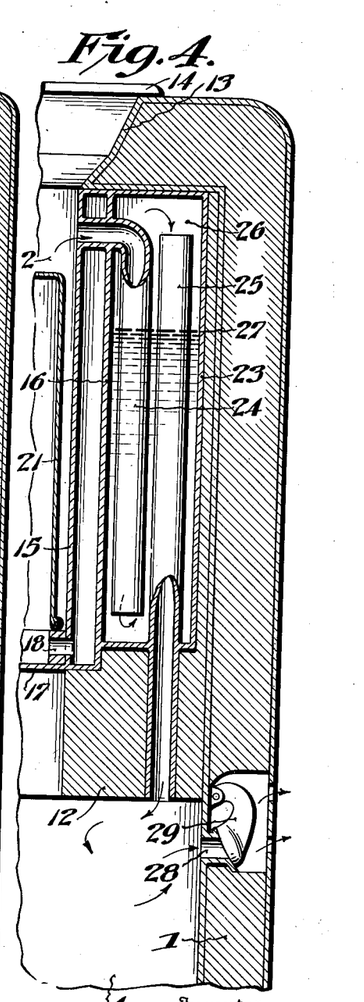
Fig. 4 is an enlarged fragmentary sectional view of the upper right hand portion as illustrated in Fig. 2, to better show the gas pressure control and escape means.

As gas is discharged into the freezing section 4, it will be necessary to provide for escape or outflow discharge of this gas, but at the same time it is desirable to maintain the discharge under pressure and to guard against inflow or back flow of atmospheric air. To accomplish the escape or discharge of the gas from the freezing section 4, I provide a discharge outlet tube 28 preferably opening from the freezing section 4 at a point high up on one side. As shown in Fig. 4, a weighted swinging valve 29 can be mounted to normally close over the open outer end of the gas discharge tube 28, to maintain this discharge tube closed against out flow of the gas except when the pressure is sufficient to swing up the weighted valve 29 to clear the outer end of the gas discharge tube 28, the valve 29 serving at all times to positively guard against and prevent back flow of atmospheric air into the freezing section 4. After the gas pressure in freezing section 4 has become sufficient to raise valve 29 from the closed position, the gas under pressure will be discharged through the discharge tube 28 and will escape into the atmosphere or can be conducted off to any suitable discharge point, as may be desired. It will of course be understood that when the pressure of gas within the freezing section 4 is so reduced that it is not sufficient to raise or unseat the valve 29, the gas will be held and accumulated within the freezing section 4.

With the parts constructed in the manner set forth, to charge the refrigerator, the cover 14 and the blanket 21 will be removed. Solidified carbon dioxide in lump or cake form, or other suitable refrigerant agency, will be then placed within the refrigerant container space or section 2, to rest upon and be supported by the upper side of the bottom portion 17. The blanket 21 is then fitted in place and the lid or cover 14 is closed. As the temperature within the freezing space 4 will be normally higher than the temperature immediately surrounding the block or cake of refrigerant, heat will be absorbed through the bottom partition or wall or member 17, and the absorption of heat will cause sublimation of the solidified carbon dioxide or refrigerant. The rate of sublimation will of course be dependent somewhat upon the temperature within the freezing section 4, and as gas is generated, this gas being heavy will remain low down within the blanket and will pass through openings 18. The expanding gas will then rise through the space 16, and will escape through openings 19 to be within the confines of the metal wall 15, and substantially around and on all sides of the blanket 21. The heavy gas will drop down between the wall 15 and the sides of the blanket 21, and the weight of the gas at this point and within the space 16 will tend to accumulate a pressure around the solidified refrigerant. As the gas conducting tube 24 opens into the upper part of the refrigerant container section 2, the upper strata of gas will be permitted to discharge through this gas conducting tube 24 into the gas space 26 of the liquid seal and valve chamber 23. However, as the liquid column or head at 27 is maintained within the liquid seal and valve chamber 23, the gas will escape only when the pressure within the section 2 is sufficient to overcome the head or pressure of liquid at 27. When the gas pressure within the section 2 has increased to the discharge or escape pressure, gas will flow through gas conducting pipe 24 and will rise through the liquid level at 27 to accumulate within the gas accumulation space at 26. Then, as gas discharge pipe 25 leads from this gas accumulation space 26, the gas will be conducted into the freezing section 4. Through sublimation solidified carbon dioxide will produce a substantially pure carbon dioxide gas, and this inert gas discharged into the freezing section 4 will aid in preservation of meats and other materials that may be stored in the freezing compartment or section 4. Through the medium of the valve 29, a predetermined and fixed gas pressure is retained within the section or compartment 4. Of course, some other form or type of gas pressure regulating and maintaining valve or means can be employed, and it is possible that any one of the many forms of adjustable pressure regulating and pressure control valves or means now on the market and well known might be employed.

Figure 9:
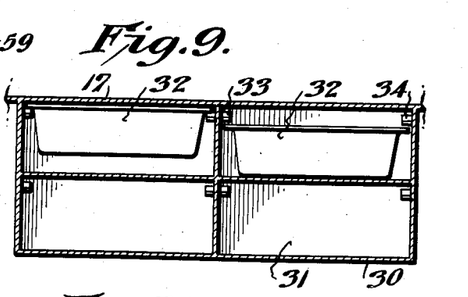
Fig. 9 is a fragmentary view in front elevation showing ice cube tray assembly.
Figure 10:
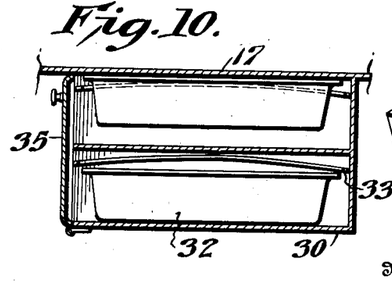
Fig. 10 is a sectional view to better illustrate ice cube tray holding means for quick freezing.

It will be appreciated that the heat is extracted from the freezing section 4 through the bottom plate or wall 17, and consequently the upper portion of this section is reduced to the lowest temperature of any part of the space within the compartment 3. With this in mind, I provide below the bottom wall 17 of the refrigerant container compartment 2, a supporting structure 30 to receive and hold ice trays, or to hold other containers or material to be submitted to freezing temperatures. As shown in Figs. 9 and 10, this supporting structure is divided up by partition and supporting walls to provide a plurality of ice mold tray compartments 31, adapted to receive and support and hold ice mold trays 32 of usual construction, or of any desired type and form. As illustrated at the upper right hand side in Fig. 9 and at the bottom in Fig. 10, these ice mold trays can be set to be supported with their bottoms resting upon the floor or supporting partitions of the structure 30, and in this position the contents of the trays or material placed within the compartments 31, will be subjected to heat extraction and freezing. However, where quick freezing of ice cubes or other materials within the trays 32 is desired, it will be found that better and quicker results are accomplished with the ice tray structure directly in contact with the plate or bottom portion 17, or held tightly in contact with portions of the supporting structure 30 directly associated with the bottom plate 17. With this purpose in mind, I provide springs 33 and 34 within the compartments 32 closely adjacent to the top thereof and on each side. The springs are located at points sufficiently high up to permit the ice tray 32 to be inserted within the compartment 31 to rest or stand upon the bottom, and yet by raising the pan and inserting the pan or tray 32 with the rim flange thereof over the tops of the springs 33 and 34, the ice tray 32 will be held in elevated position and will be forced up against the bottom 17, or other wall forming the top of the compartment 31. With this direct contact between the tray 32 and the bottom wall 17, I have found that it is possible to freeze ice cubes in a relatively much less time than where the tray 32 is not in contact with this bottom heat absorbing wall 17. With the direct contact, it appears that the entire ice tray 32 becomes a heat absorbing wall and substantially a continuation of the bottom wall 17 of the refrigerant container compartment 2, to thus give a surrounding metallic heat absorbing wall on all sides of the material contained within the tray 32, and to be chilled or frozen. One or more doors 35 can be fitted and mounted in any desired manner, to provide for closing the open fronts of the compartments 31, and if desired, a separate opening might be provided in the cabinet 1 to give access to these compartments 31, without the necessity of opening the main door into the compartment 3. In some instances it may be found desirable to provide a packing gasket, or other suitable packing to exclude gas from the compartments 31, as in the use of carbon dioxide and similar refrigerants the gas of sublimation will substantially fill the freezing section 4, and some materials to be frozen may require exclusion of the gases during the freezing operation.

Figure 11:
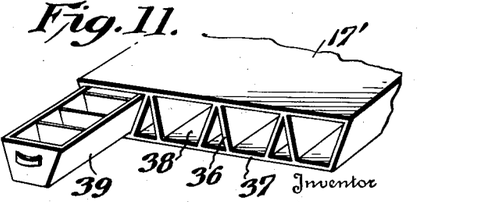
Fig. 11 is a fragmentary perspective view showing a modified construction of the ice cube tray assembly.

In Fig. 11 I have shown a modified form of ice tray support and container, and here the bottom plate 17' has walls 36 depending on the lower side thereof in slightly angular disposition. A bottom plate 37 connects across these walls at their lower edges to provide and form a plurality of individual slide or guideways 38 to receive and hold relatively narrow ice tray or freezing molds 39. As indicated, the ice tray or freezing molds 39 can be provided with partitions or can be otherwise divided off to form individual blocks or ice cubes, and due to the fact that the trays 39 are held directly in contact with the walls 36 and 37, and are in contact at their upper edges with the bottom wall or plate 17' of the refrigerant section, a very quick freezing or chilling of the contents of the trays 39 results. With the individual or single row trays 39 having their side walls inclined, direct contact with the walls 36 of the supporting structure is assured, and at the same time a greater mass of metal is immediately surrounding the liquid in each tray. As this metal is directly connected with the bottom plate or wall 17', a quick and satisfactory heat absorption is accomplished and very quick freezing of liquid within the trays 39 is possible.

The supporting freezing structure as illustrated in Figs. 9, 10 and 11, can be made of any suitable metal or other material that will absorb heat and will serve as a good conductor, and these parts can be made of sheet aluminium, galvanized sheet metal, or of any other desired sheet metal fabricated to the necessary form; or, the heat absorbing structure can be made of cast aluminium or other suitable cast metal or conducting material, and obviously, the rapidity of freezing or chilling action can be accelerated or decelerated by selection of the material and by construction to hasten or retard heat absorption.

The partition or baffle wall portion 6 has on the lower side thereof a plurality of substantially parallel fin plates 40 arranged in depending relation and extending preferably across the length of the wall portion 6, but stopped short of the ends thereof. An inclined baffle plate 41 is mounted and supported beneath the partition wall portion 6, and is preferably connected with the several heat absorbing ribs 40. This baffle plate 41 serves to create a natural circulation of air contained within the storage section 5 of the compartment 3, due to the fact that heat is absorbed through the plate or wall portion 6 by the differential in and the relatively low temperature in the freezing section 4. The warmer air within the storage section 5 will have a tendency to rise to the highest point within this storage section, and consequently will rise along the inclined lower face of the baffle wall 41 to enter between the most restricted end opening spacing the walls 6 and 41. As the air comes in contact with the wall portion 6, heat will be absorbed therefrom and the air will then flow substantially from left to right as indicated by the arrows in Figure 1, to be discharged through the wider open end between the walls 6 and 41. In this way, the air within the storage section 5 is maintained in substantially constant circulation, and a more uniform temperature can be attained and maintained in all parts of the storage section 5.

As has been stated, the wall portion 6 fits across within the compartment 3 to divide the compartment within the cabinet into substantially separate and distinct freezing and storage sections 4 and 5, and it is intended that the gas of sublimation shall not enter the storage section 5, and that the storage section shall be chilled by heat absorption through the wall portion 6. Consequently, this storage compartment 5 is entirely separated from the main heat absorbing portions, and no part of the walls thereof will ordinarily be chilled to the frosting point, in consequence of which moisture contained in the air circulated within the storage section 5 will not be extracted as frost, and foods and other materials within the storage section will not be dehydrated. In use, the effect of the section 5 is a storage section with a natural circulation of air and with no part frosting, thus making possible the use of the entire storage section 5 as a hydrator, and obviating the necessity for storing foods and other materials in closed or covered containers, or otherwise guarding against possible evaporation of moisture.

As indicated by the dotted lines in Figure 1, the partition or wall portion 6 can be raised or lowered to vary the relative size of the freezing section 4 and the storage section 5. Thus, for example, on a Saturday the housewife purchasing large quantities of meats and other foodstuffs requiring freezing or extreme chilling for their preservation can fit this wall 6 in the lowermost position as indicated, thus giving a relatively larger freezing section 4 and a relatively smaller storage section 5. When the foodstuffs have been cooked or prepared, it is desirable that they be stored and preserved at a relatively higher temperature, and then with the uncooked stock materially decreased and the cooked supplies relatively increased, the wall 6 can be adjusted to the upper dotted line position, and the freezing section 4 is decreased in size and capacity while the storage section 5 is proportionately increased in size and capacity.

This partition wall portion effectively and completely divides the lower compartment from the freezing compartment and the refrigerant container structure, so that no portion of the storage compartment is so chilled as to cause frosting upon the walls. As there is no frosting within the storage compartment, moisture will not be taken from vegetables or other foods, but this entire compartment will act and serve as a hydrator to preserve the moisture in the foods or materials contained therein.

If desired, and under some conditions and in some uses, it may be found desirable to fixedly place the wall portion 6 in high-up position to substantially eliminate the freezing compartment and provide a large storage space which will act and serve as a hydrator or storage compartment. Thus, substantially the entire space can be used as a hydrating compartment.

Further, the partition or wall portion 6 can be so constructed and mounted that the flow of gas into the space or section 5 is precluded, and then the section 5 can be used for storage of foods or materials in cooled hydrated air. If found desirable, provision can be made for supply of atmospheric air to this section, and circulation of the air thus applied.

The section 4 has been referred to as a freezing section, primarily because the ice cube or freezing assembly within the structure 30 is located therein, but it will be appreciated that this space can be advantageously used for the storage of frozen or frosted products, and that where frosted products are stored in the space 4 they can be maintained in perfectly preserved condition for substantially indefinite periods, and that as portions may be desired to be defrosted, these portions of the foodstuffs can be transferred to the space 5 and will then gradually thaw out in the higher temperature and in the maintained circulation of air within the section 5.

As has been stated, where solidified carbon dioxide or a similar refrigerant is used, the gas of sublimation will be circulated through the section 4, and this inert gas will also aid in the preservation of meats and other food stuffs.

In some instances it may be found desirable to exclude the gas from the main portion of the section 4, or to considerably enlarge the food storage section 5, and then the wall 6 can be fitted high up in the compartment 3, substantially as illustrated at 42 in Figure 1.

Figure 6:
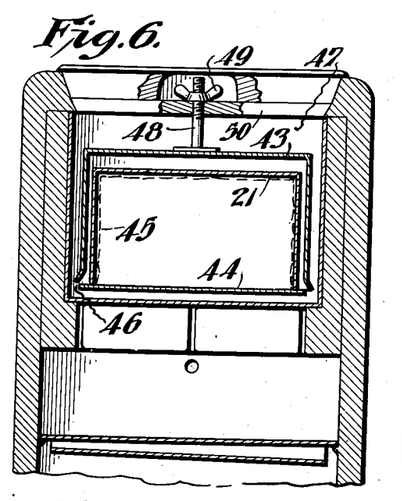
Fig. 6 is a fragmentary sectional view through the upper portion of a refrigerator illustrating one form of temperature control means.

As the temperature of the wall or bottom 17 of the refrigerant section 2 varies proportionately to the proximity of the block of refrigerant thereto, I find it advantageous to provide means to establish direct heat absorbing contact between the cake or block of refrigerant and to permit the refrigerant to be moved away from the bottom wall or partition of the refrigerant storage section. Referring to Fig. 6, I have shown a container or case 43 having a bottom wall 44 to receive and support a cake or block of refrigerant, as indicated by the dotted lines at

45. This container 43 has gas escape openings 46 preferably through the sides thereof immediately adjacent to the bottom 44, and thus the gas of sublimation can escape to flow into the refrigerant compartment 47, to then be conducted to a discharge in the manner set forth above, or in any other desired way. A screw threaded suspension rod 48 extends upwardly from the top of the container 43 and a wing nut 49 is turned onto the screw threaded end of this rod 48. A cross bar or partition 50 has an opening therethrough to slidably receive the rod 48, and the wing nut 49 is on the upper side of this cross bar or partition 50. Thus, when it is desired that the refrigerator operate at full capacity, the wing nut 49 will be loosened and the container 43 will be lowered so that the bottom wall 44 thereof rests directly upon the bottom wall of the refrigerant compartment 47, and this direct heat absorption is accomplished through the bottom wall. At night when the refrigerator door will not be opened for considerable periods, or at other times when the refrigerator need not be operated at full capacity, the wing nut 49 can be tightened or screwed down to raise the bottom portion 44, and consequently the block of refrigerant 45 so that there is no direct thermo conducting contact of any of these parts with the bottom wall of the refrigerant compartment 47.

Figure 7:
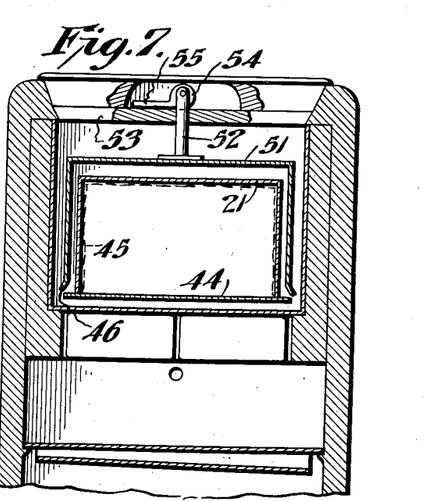
Fig. 7 is a view similar to Fig. 6 showing a modified construction of the temperature control means.

In Fig. 7 I have shown a slightly modified form in which the container or case 51 for the refrigerant has a suspending rod 52 extending upwardly therefrom and slidably received through an opening in the cross bar or partition 53. A cam 54 is revolubly associated with the upper end of the suspending rod 51 and bears against the upper side of the cross bar or partition 53, so that when the cam 54 is swung, through the medium of handle 55, to the position shown in Fig. 7, the bottom of the refrigerant case is lifted from thermo contact with the bottom of the refrigerant container section. When the cam is swung in the opposite direction, it will be obvious that the bottom of the case will be lowered to rest in thermo conducting contact upon the bottom wall of the refrigerant container section.

Figure 8:
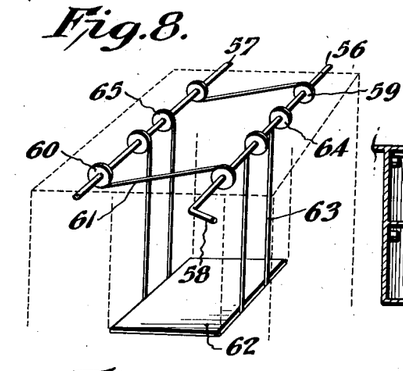
Fig. 8 is a skeletonized perspective view illustrating another modified temperature control means.

In Fig. 8 I have illustrated another modified construction, in which the winding shafts 56 and 57 are rotatably mounted transversely across within the case and supporting structure with the end 58 of one rod extending as an operating handle. Through pulley or drum wheels 59 and 60 and belts or cables 61, the two shafts 56 and 57 can be rotated together. A supporting plate 62, which can carry any suitable refrigerant case, is movably fitted within a refrigerant storage space, and cables 63 wound upon wheels or drums 64 and 65 on the shafts 56 and 57 are adapted to hold this supporting plate 62 suspended to permit raising of the same to a position spaced above and from the bottom of a refrigerant storage space, and lowering thereof to rest in thermo conducting contact upon the bottom wall of the refrigerant storage space. Obviously, other forms and constructions of the parts can be resorted to in providing for raising or lifting and lowering of the block or cake of refrigerant.

The blanket 21 can be employed in the forms of construction shown in Figs. 6, 7 and 8, if desired. As has been stated, this blanket 21 is illustrated as distended to its fullest size, and it will be understood that the blanket will be made of such shape and dimensions as to readily accommodate and yet closely fit over a cake or block of refrigerant of the maximum size for the capacity of the particular refrigerator. Then, as the evaporation or sublimation reduces the size of the block or cake of refrigerant, the blanket will fold down or will drape itself to the diminished and altered size and shape and bulk of the mass of the solidified refrigerant. In this way, the blanket covers and protects the block or mass of refrigerant from direct air and gas contact, and the evaporation or sublimation is thus very materially slowed and retarded.

Further, as I interpose the wall portions 15 and 16 and introduce additional insulation at 12, and employ a heavily insulated door or cover at 14, it is possible to maintain the wall portions surrounding the cake or block of refrigerant with cold metal walls which will not have a tendency to absorb heat and thus cause evaporation or sublimation around the sides and top of the cake or block of refrigerant. As the escaping gases of sublimation pass substantially in the course indicated by the arrows in Figure 1, the wall 15 is maintained at all times at a low temperature, and this wall thus interposes a baffle against heat absorption around the sides of the block of refrigerant, and through the sides of the case and insulating structure.

As the parts are illustrated in Fig. 8, it will of course be understood that some ratchet or other stop means will be provided to hold the shafts 56 and 57 against rotation when the block of refrigerant is raised, thereby placing strain upon cables 63.

The liquid level at 27 can be raised or lowered, depending upon the pressure desired to be maintained within the refrigerant storage space 2; and obviously, the nature and character of the liquid can be varied to suit different conditions of use. The maintenance of a gas pressure within the refrigerant storage space 2, and consequently around the block or cake of refrigerant will retard sublimation or evaporation, and in consequence the refrigerant will last for a longer time. By varying the height of the liquid at 27, it will be possible to vary the pressure maintained within the refrigerant storage space 2, and to thus vary the rate of sublimation or evaporation, as weather conditions or the condition of the atmosphere in the place where the refrigerator is located may require.

Figures 12, 13, 14, 15, 16:
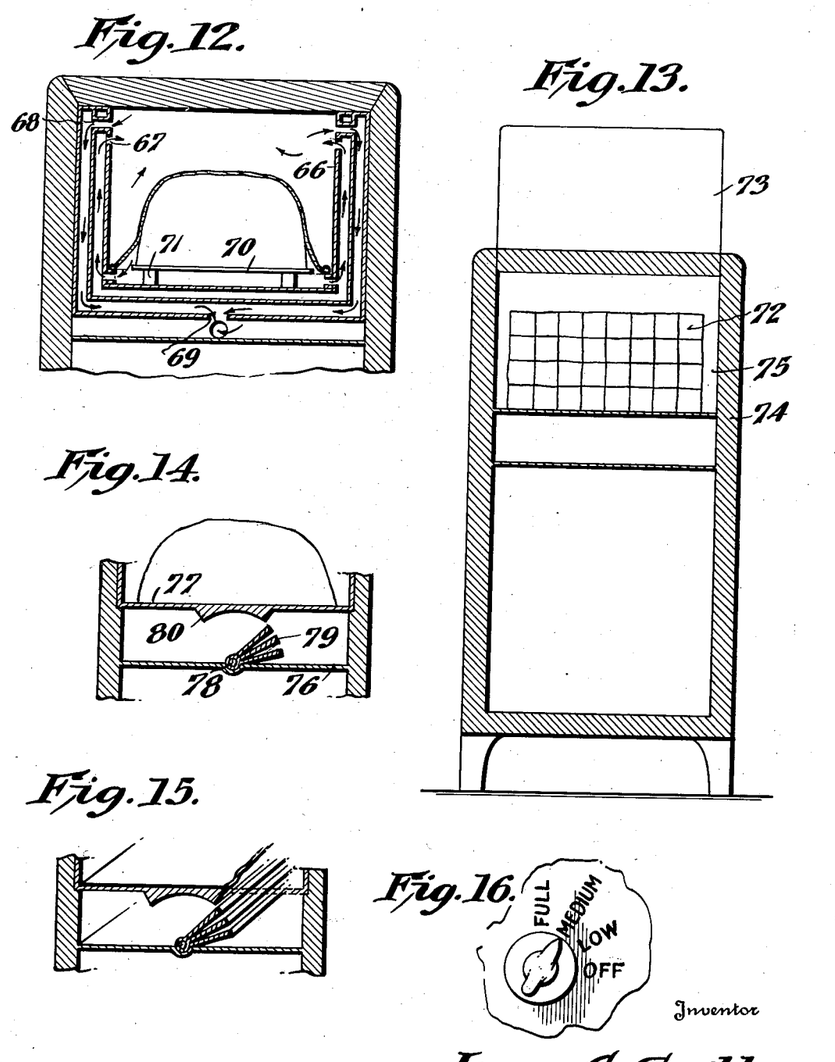
Fig. 12 is a fragmentary sectional view illustrating another modified form of solidified refrigerant container.
Fig. 13 is a sectional view disclosing a modified construction adapted for installation with a refrigerating cabinet to permit storage of ice cubes.
Figs. 14, 15, and 16 are fragmentary detail views illustrating a modified means of controlling the heat transmission from the storage compartment to the refrigerant container.

Fig. 12 illustrates a modified construction in which the container 66 has plural-walled side and bottom portions, with the walls separated or spaced and having gas escape passages 67 and 68 at separated or spaced locations so that the gas in passing from the container must follow in labyrinthian path to the gas discharge opening 69. In this way, the circulating gas resulting from sublimation of the solidified carbon dioxide follows through the labyrinthian or tortuous course and not only accomplishes heat absorption, but also effectively protects the cake of solidified refrigerant to slow or retard the sublimation. Further, I may provide a supporting rest 70 for the cake or block of solidified refrigerant, which rest is carried on the insulating legs or supports 71, of wood or other material having low temperature conducting properties.

In Fig. 13 I have disclosed a refrigerator in which the humidity of the air within the refrigerator cabinet is positively maintained by the introduction of ice cubes, as at 72. As shown, the refrigerant container 73 is mounted on the upper part of the cabinet 74 and space is provided at 75 to receive and hold and contain a plurality of ice cubes assembled in substantially the form of a block. The ice cubes will lower the temperature within the cabinet 75, and solidified carbon dioxide, or any other suitable solidified refrigerant can be placed in the container 73 to attain and maintain any predetermined and desired temperature, say around 35 degrees to 40 degrees Fahrenheit, which will not only give a proper storage temperature within the cabinet 74, but will maintain the ice cubes at 72 against excessive melting. The ice cubes are of course available and are intended for domestic or other use as may be desired, and a new supply of ice cubes can be placed in the space at 75 as desired or necessary.

The drawings in Figs. 14, 15 and 16 illustrate cold controls, or temperature controls, by which settings of the parts can be made to vary the heat absorption conductivity, to thus make possible attainment and maintenance of "high," "medium," "low," and "off" settings. Relative temperatures can be maintained by the amount of conducting metal interposed between the wall 76 and the platform 77 on which the solidified carbon dioxide or other solidified refrigerant is supported. A shaft 78 has one end thereof extending through the forward side of the cabinet structure, or otherwise exposed and presented to be manipulated, and preferably this shaft 78 has on the exposed end thereof a manipulating knob or dial or handle 79 by which the shaft can be turned to the different positions shown by the indicating markings. The plate 77 has on its lower side a mass of metal 80 which is made with its lower face concave somewhat after the manner of a hollow cylinder having a center coinciding with the axis of the shaft 78. Conducting fins 81, of metal or any other suitable heat conducting material, are provided to extend radially from the shaft 78, and this shaft 78 is preferably in full thermal conducting contact with the plate or wall 76. As the shaft 78 is turned or rocked, the various conducting fins will be moved into or from the concave opening of the mass or conducting material at 80, and since the conducting fins 81 preferably bear against the concave face, direct heat conducting masses of metal are interposed in greater or lesser quantity as may be desired.

Figure 17:
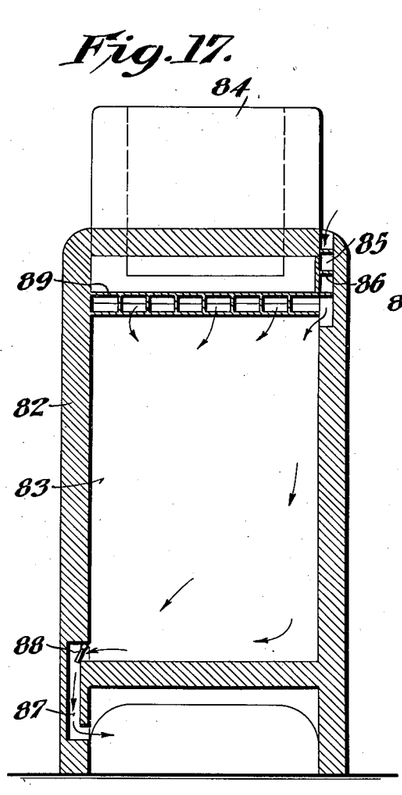
Figs. 17 and 18 are sectional views showing a modification in which atmospheric air is circulated through the storage compartment.
Figure 18:
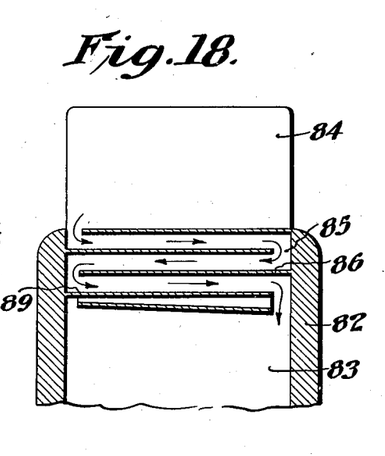

In Figs. 17 and 18 I show a modified construction in which fresh air is permitted to enter the food storage compartment in quantity and volume sufficient to keep the air within the storage compartment pure and free from noxious and toxic gases, and other contamination. At the same time, provision is made for escape of such injurious or deleterious air or gases, to thus insure air conditioning and maintenance of a humidified and healthful atmosphere within the storage compartment. As shown, the cabinet 82 has the storage compartment 83 in the lower part thereof, and a refrigerant container is provided at 84. At one side of the refrigerant container 84 an air intake space 85 is provided, and this space has therein baffle walls 86 so that a long circuitous or tortuous air intake passage is thus provided. Near the bottom of the compartment 83 I provide an air and gas escape passage 87, and at the intake end thereof I mount a check valve 88 to guard against back flow of gaseous air and against the entrance of atmospheric air through the passage 87. With this arrangement, pure and fresh atmospheric air can enter through the passage at 85, and noxious gases and vitiated air can discharge through passage 87. The baffle wall 89 can be constructed and mounted similar to the wall 6, and can be provided on its lower side with an inclined wall and circulating vanes similar to the wall 41 and the vanes 40 of the baffle wall 6.

Figure 19:
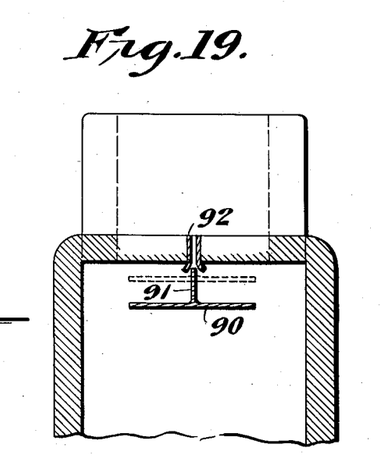
Fig. 19 is a fragmentary detail view disclosing another form of apparatus for controlling heat transmission from the compartment to the container.

Fig. 19 discloses a modified form of fixed temperature regulator, wherein the heat absorbing plate 90 is carried by a conducting plate 91 slidably and frictionally held in clip plates 92. By adjusting the relative height of disposition of this plate 90, the total area of the parts 90 and 91 exposed within the storage compartment can be considerably varied, and thus the heat absorbing or conducting areas can be made greater or less, as occasion may require.

Figure 20:
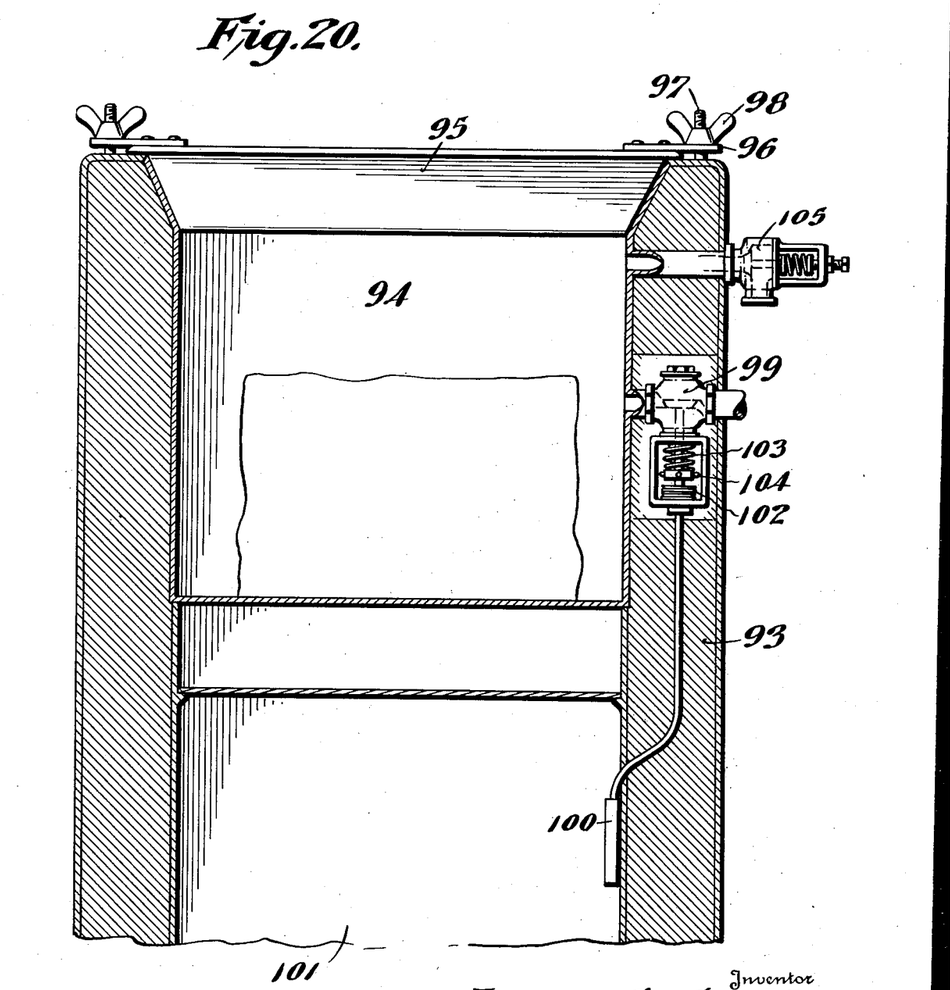
Fig. 20 is a sectional view through the upper portion of a refrigerator cabinet structure illustrating an adaptation to confine the gases of sublimation of a solidified refrigerant, together with temperature controlled means for allowing escape to speed up sublimation and means to guard against building up of an excessive gas pressure within the container.

With the modified construction shown in Fig. 20, I have illustrated somewhat diagrammatically the main portions, and here the cabinet 93 has a container 94 in the upper part thereof to receive and hold solidified carbon dioxide, or a similar solidified refrigerant. This container 94 is closed on its sides and bottom, and a top 95 is provided to be fitted in place to close and seal the container 94 to be substantially gas tight. To this end, I have illustrated the use of clamping lugs 96 having clamping bolts 97 fitted therethrough, clamping nuts 98 being turned onto the clamping bolts 97 to bear against the clamping lugs 96 and thus hold and seal the cover 95 in place. A gas escape valve 99 is provided in a passage opening into the container 94, and this valve 99 can discharge to the atmosphere, or any other desired point. A temperature influenced member 100 is provided in the storage compartment 101, or at any other desired location from which temperature control is to be taken, and this temperature influenced member 100 is in turn connected with a bellows or temperature influenced portion 102, which acts upon the valve stem 103. If desired, an adjusting member or mechanism 104 can be provided to vary the pressure at which the temperature influenced portion 102 will operate, to thus set the valve 99 to be opened at various desired temperatures. With this arrangement, the valve 99 will normally be closed to thus maintain and retain the gas of sublimation within the container 94. Experiments have indicated that sublimation of solidified carbon dioxide is mainly due to differences between the temperature of the solidified refrigerant and that of the surrounding air, and the sublimation is also hastened by decreases of pressure. I have found that by excluding atmospheric air, and maintaining the gas pressure within the container at several atmospheres, say not exceeding 5.3, the temperature of the solidified carbon dioxide is raised to about −56 degrees C., without liquification of the solidified carbon dioxide, and that in this way the so-called triple point of carbon dioxide is approximately approached and is maintained to decrease the sublimation, or substantially arrest sublimation. Obviously, when the temperature within the storage compartment 101, or within any other space or compartment to be cooled, rises above the desired degree, the temperature influenced device or apparatus at 100 will function to cause opening of the valve 99 thus permitting escape of gas to lower the pressure and allow commencement of sublimation with consequent heat absorption to lower the temperature within the compartment 101. As valve 99 is intended to close positively and completely, it becomes desirable, if not necessary, to provide for emergency gas escape, and this is accomplished through a blow-off or safety valve or pop safety valve, indicated at 105, and which can be of any desired or approved or suitable construction, and can be mounted at any desired point to communicate with the container 94. The valve 105 can be adjustable to thus permit variation of the blow-off or discharge pressure, and for most satisfactory results this will preferably be substantially at, or perhaps slightly above the desired pressure to be maintained with the container 94. Obviously, the double wall construction can be embodied in the container 94, substantially as has been described above; the valve 99 can be connected to substantially displace and replace the valve 29 as illustrated in Figs. 2 and 4; and, other modifications and variations can be resorted to in the carrying out of this embodiment of my invention.

Heretofore, one of the difficulties encountered in refrigeration, with commercial and domestic refrigerators, has been the generation or maintenance of sufficient energy to attain a temperature desirably lower than ordinary atmospheric or room temperature, and as power and other costs have been directly proportionate to the amount or quantity or volume of air to be chilled, it has been the practice to make refrigerator or storage spaces relatively small, and to close the same to be practically airtight, to thus limit the volume of air to be chilled and to prevent ingress of atmospheric air. Where a dead body of air is maintained in a closed compartment containing food or other products to be preserved, the air absorbs moisture from the stored material, thus often dehumidifying the food or other material excessively; the maintenance of the dead body of air promotes absorption of toxic gases and noxious odors and encourages maintenance and growth or development of atmospheric conditions often harmful to the stored foods or other products, and consequently deleterious to the health of a person eating or using the stored foods or products. Maintenance of circulation of clean fresh air, and elimination of toxic gases, odors, and other injurious and noxious conditions of the air, are desirable to proper conditioning of air within a refrigerating compartment, and maintenance of materials stored therein in a proper and healthful condition.

My apparatus, as described above, is of such construction that an excessive margin of refrigeration is obtained, and for this reason I find it practicable to allow the flow of pure chilled air through the refrigerating space to keep the air within this space free from contamination, thus attaining a substantially perfect condition for refrigeration and for the preservation of foodstuffs and the like against deterioration, spoiling, or other conditions that might render the same unfit for use or injurious when used as food or the like. In addition to low temperature maintenance, proper and healthful preservation of foods, and the like, requires: air purification or the elimination of gases of oxidation and of noxious odors; proper and adequate relative humidity and freedom from likelihood of excessive absorption of moisture from the stored product being refrigerated; continuous and proper circulation of air without excessive absorption of moisture; and, uniformity and consistency of temperature and maintenance of a sufficiently low temperature for the purposes desired.

From the foregoing description and showing it will be seen that I have provided a refrigerator which can be humidified with a block of ice made from ice cubes, this addition being highly useful as providing an auxiliary refrigerating medium and also permitting storage of and making available a sufficient and constant ice supply maintained in proper condition by the solidified carbon dioxide or other major refrigerating material or medium.

Further it will be seen that I have provided for air conditioning in a household or other refrigerator, since the excessive energy of the refrigerant employed, and the manner of using the same, permit venting to supply outside or atmospheric air flowing to and circulating through the refrigerating compartment, which air is properly chilled at the intake, and is then allowed to escape carrying with it any toxic gases to prevent contamination of the air and contents of the refrigerator. This air purification eliminates gases of oxidation and other toxic or injurious gases, and carries off noxious odors and the like.

With the adjusting and control means, it will be seen that I provide for accurate and ready control of the temperature to which the refrigerating chamber is reduced, and also that I regulate and control the release of energy from the refrigerating medium or material.

It will of course be appreciated that dehydration of food or other products stored or placed within the compartment is reduced to a minimum, by the construction and arrangement and use of the parts as set forth, that the slow melting of the ice will provide running water to absorb and carry off undesirable gases and odors and the like, and that in general the structure and the use and the operation and the method as hereinbefore set forth will result in attainment and maintenance of substantially ideal conditions within the refrigerator.

From the foregoing it will be seen that I have provided a refrigerator structure which is well adapted for use of solidified carbon dioxide, or some other refrigerant material, and that provision is made for control and variation of heat absorption, for variation of the temperature in different parts of the compartment, for employment of the preservative influences of an inert gas of sublimation, for circulation of confined air in a closed storage compartment without absorption of moisture to thus give a natural hydrator compartment, for control of the speed of freezing of ice cubes and the like, and for general improvement in the efficiency and economy of refrigerating results.

While I have herein shown and described only certain specific embodiments of my invention and have suggested only certain possible modifications, it will be appreciated that many changes can be made in the form, construction, arrangement, assembly and association of the parts, and in the manner of controlling and using the equipment, without departing from the spirit and scope of my invention.

I claim:

1. A refrigerating apparatus comprising, an insulated cabinet having a storage space in the lower portion thereof, a container in the upper portion of said cabinet to receive and hold a solid refrigerant and separated from the storage space, a tube leading from the container, a tube leading into said storage space, and a liquid seal between said tubes to allow flow of gas from said container into the storage space and to check against return flow of gas and air.

2. A refrigerating apparatus comprising, a cabinet having in the lower portion thereof a storage space, a container carried in the upper part of said cabinet separated from the storage space and having a bottom portion serving as the top of the storage space, adjustable means in said container to support a solidified refrigerant and to be adjusted to vary the disposition and separation of the refrigerant above and with respect to the upper side of the bottom wall of the compartment, and a double walled tortuous passage around the container to retard the flow of gas of sublimation.

3. A refrigerating apparatus comprising, a cabinet structure, a container in said cabinet structure to receive and hold a refrigerant and having the bottom wall portion thereof exposed, an ice tray, and spring means engaging the rim of the ice tray to resiliently hold and urge the rim of said ice tray into contact with the exposed wall.

4. A refrigerating apparatus comprising, an insulated cabinet, a container in the upper part of the cabinet to receive solidified carbon dioxide and having the bottom wall thereof exposed to be accessible from the lower part of the cabinet structure, guideways located adjacent to the bottom wall of the container, ice trays insertable into said guideways to be in proximity to the bottom wall, spring means to urge said ice trays into thermo conducting contact with the bottom wall of the container, and means within said container to vary the proximity of a refrigerant within the container to said bottom wall to thus vary the freezing time resultant from the close thermal association of the parts.

5. A refrigerating apparatus comprising, a cabinet structure having the lower portion thereof serving as a storage space, a container in the upper part of said cabinet closed from direct communication with the storage space and adapted to contain a diffusible solidified refrigerant, a five-sided flexible blanket covering supported upon and conforming to the solidified refrigerant in said container to cover said refrigerant on all sides except the bottom of the container, and means to adjust and vary the position of the refrigerant with respect to the bottom of the container.

6. A refrigerator comprising, with a case structure, a container in said case structure to receive and hold solidified carbon dioxide which by diffusion will extract heat from said case structure, said container having the bottom wall thereof exposed within the case and having the sides thereof multiwalled and thus constructed as tortuous passages, and valve means associated with the outlet from the tortuous passages of the side wall, said container to retain the gases of diffusion from solidified carbon dioxide to serve as an insulating blanket on all other sides of the container.

7. A refrigerator for use with solidified carbon dioxide comprising, a closed compartment, a container in the upper part of said compartment separated therefrom and adapted to receive the solidified carbon dioxide, a passage from said container to the upper part of said compartment through which the gas evolved from sublimation of said solidified carbon dioxide can flow from the container to the compartment, means associated with said passage to maintain a gas pressure within the container, a passage from said compartment for escape of gas, and means to maintain a pressure of gas within the compartment.

JAMES G. SCOTT.